United States Patent [19]
Yamawaki

[11] Patent Number: 5,446,659
[45] Date of Patent: Aug. 29, 1995

[54] TRAFFIC ACCIDENT DATA RECORDER AND TRAFFIC ACCIDENT REPRODUCTION SYSTEM

[75] Inventor: Yuichiro Yamawaki, Kobe, Japan

[73] Assignee: Awaji Ferryboat Kabushiki Kaisha, Kobe, Japan

[21] Appl. No.: 227,733

[22] Filed: Apr. 14, 1994

[30] Foreign Application Priority Data

Apr. 20, 1993 [JP] Japan ................... 5-092626

[51] Int. Cl.⁶ ............................................. G06F 19/00
[52] U.S. Cl. ........................... 364/424.03; 364/424.04; 340/438
[58] Field of Search ............ 364/424.03, 424.04, 364/550, 551.01; 340/438, 439; 360/5, 6

[56] References Cited

U.S. PATENT DOCUMENTS

| | | | |
|---|---|---|---|
| 4,533,962 | 8/1985 | Decker et al. | 360/5 |
| 4,638,289 | 1/1987 | Zottnik | 364/424.04 |
| 4,817,118 | 3/1989 | Wilburn et al. | 364/424.04 |
| 4,939,652 | 7/1990 | Steiner | 340/438 |
| 5,046,007 | 9/1991 | McCrery et al. | 364/424.04 |
| 5,249,127 | 9/1993 | Komatsu | 340/438 |

FOREIGN PATENT DOCUMENTS 2020127 11/1979 United Kingdom .

Primary Examiner—Gary Chin
Attorney, Agent, or Firm—Marshall, O'Toole, Gerstein, Murray & Borun

[57] ABSTRACT

A traffic accident data recorder comprising an acceleration sensor 3, an angular velocity sensor 4 if necessary, a memory 8, and a control section 7 for controlling the recording in the memory 8. When the output datum from the acceleration sensor 3 or the angular velocity sensor exceeds a predetermined value, the control section 7 recognizes that time as a traffic accident occurrence time, and stores the acceleration data and angular velocity data before and after then or after then in the memory 8. By analyzing the data with a traffic accident data reproduction system, it is possible to reproduce the state at the traffic accident occurrence time.

7 Claims, 9 Drawing Sheets

TRAFFIC ACCIDENT DATA RECORDER AND TRAFFIC ACCIDENT REPRODUCTION SYSTEM

FIELD OF THE INVENTION

The present invention relates to a traffic accident data recorder mounted on a vehicle for land transportation such as a car, a vehicle for marine transportation such as a ship, or other vehicles such as an aircraft, or the like. The recorder stores acceleration and angular velocity data of the vehicle prior to and at a traffic accident (which is defined as a general term for vehicle accidents which occur on the earth, on the sea and in the air), and the occurrence time. The invention further relates to a traffic accident reproduction system for reproducing the traffic accident by using the traffic accident data stored in the traffic accident data recorder.

BACKGROUND OF THE INVENTION

Generally, it is very advantageous to know the condition or state of a vehicle when a traffic accident has occurred involving the vehicle, in order to look into the cause of the accident. As an example of apparatus representative for storing data at a traffic accident occurrence time, a flight recorder mounted on an aircraft is well known. The flight recorder for an aircraft receives and records data such as the speed, acceleration, etc. of the aircraft body through wires from hydraulic cylinders, the speed indicator, sensors, etc. in the aircraft continuously while the aircraft is flying. The recording operates at least for the time from when the airplane has once taken off until it has landed.

Such a flight recorder is a very large scale and complex apparatus which, as stated above, needs data supplied from the hydraulic cylinders, speed indicator, sensors, etc. in the aircraft; there are no known examples where such a system is mounted on vehicles other than large aircraft.

On the other hand, in a traffic accident involving a vehicle such as a ship and a car, other than an aircraft, it is also very advantageous to analyze data of, for example, acceleration, angular velocity, etc. of the vehicle at the accident occurrence time, in order to look into the cause of the accident. However, because an aircraft flight recorder is a very large scale apparatus, it is not practical to apply such a system to other vehicles because of the complex mounting requirements, costs, etc., although it is theoretically possible.

The British patent publication GB 2,020,127 A discloses an accident recording system including an accelerometer. This system merely stores acceleration data during a certain time period until the vehicle speed and acceleration become zero. Therefore, this time period may not contain a traffic accident occurrence time. Also, because the above system measures only the speed and acceleration, it is not possible to know what the orientation of the vehicle has been, i.e., whether the vehicle has turned sideways or slipped sideways in an accident.

The present invention has been made in view of the foregoing situation; it is an object of this invention to provide a traffic accident data recorder, with which it is possible to determine a traffic accident occurrence time, and obtain acceleration and/or angular velocity data during a predetermined time period after or before and after the recognized time. By obtaining the angular velocity data, it is possible to know what the orientation of the vehicle has been. It is another object of the invention to provide a traffic accident reproduction system, which can reproduce the traffic accident from the acceleration and/or angular velocity data stored in the traffic accident data recorder.

SUMMARY OF THE INVENTION

A traffic accident data recorder according to the present invention is operable on a vehicle to store acceleration data of the vehicle during a predetermined time period after the time of a traffic accident. The recorder comprises acceleration measurement means for measuring acceleration at least in the traveling direction of the vehicle in a three-dimensional space to output acceleration data, storage means for storing the acceleration data, and control means for determining the traffic accident occurrence time by recognizing a time when a predetermined value has been exceeded by an acceleration datum obtained at the acceleration measurement means, for starting the storage of the acceleration data in the storage means, and for terminating the storage of the acceleration data when the predetermined time has passed after the traffic accident occurrence time.

Another traffic accident data recorder according to the invention is operable in a vehicle to store acceleration data of the vehicle during a predetermined time period before and after a traffic accident occurrence time, and it comprises acceleration measurement means for measuring acceleration at least in the traveling direction of the vehicle in a three-dimensional space to output acceleration data, storage means for storing constantly and endlessly the acceleration data during the predetermined time period up to the time of inspection, and control means for determining the traffic accident occurrence time by recognizing a time when a predetermined value has been exceeded by an acceleration datum obtained at the acceleration measurement means, and for terminating the storage of the acceleration data when the predetermined time has passed before and after the traffic accident occurrence time.

Another traffic accident data recorder according to the invention is operable on a vehicle to store acceleration data and angular velocity data of the vehicle during a predetermined time period after a traffic accident occurrence time, and it comprises acceleration measurement means for measuring acceleration at least in the traveling direction of the vehicle in a three-dimensional space to output acceleration data, angular velocity measurement means for measuring angular velocity about at least one directional axis in the three-dimensional space, to output angular velocity data, storage means for storing the acceleration data and the angular velocity data, and control means for determining the traffic accident occurrence time by recognizing a time when a predetermined value has been exceeded by an acceleration datum obtained at the acceleration measurement means or an angular velocity datum obtained at the angular velocity measurement means, to start the acceleration data and the angular velocity data being stored in the storage means, and for stopping the acceleration data and the angular velocity data from being stored in the storage means when the predetermined time has passed after the traffic accident occurrence time.

Another traffic accident data recorder according to the invention is operable on a vehicle to store acceleration data and angular velocity data of the vehicle during a predetermined time period before and after a traffic accident occurrence time, and it comprises acceleration measurement means for measuring acceleration at least in the traveling direction of the vehicle in a three-dimensional space to output acceleration data, angular velocity measurement means for measuring angular velocity about at least one direction in a three-dimensional space, to output angular velocity data, storage means for storing constantly and endlessly at certain periods the acceleration data and the angular velocity data during the predetermined time up to the present time, and control means for determining as the traffic accident occurrence time by recognizing a time when a predetermined value has been exceeded by an acceleration datum obtained at the acceleration measurement means or an angular velocity datum obtained at the angular velocity measurement means, and for terminating the storage of the acceleration data and the angular velocity data when a predetermined time has passed before and after the traffic accident occurrence time.

A traffic accident reproduction system according to the invention analyzes the acceleration of the vehicle, according to the acceleration data taken out of the traffic accident data recorder/s described above.

Another traffic accident reproduction system according to the invention analyzes the acceleration and angular velocity of the vehicle, according to the acceleration data and angular velocity data taken out of the traffic accident data recorder/s described above.

Constitution may be added which visually reproduces the speed of the vehicle according to the acceleration obtained by analyzing the acceleration data.

Further, constitution may be added which visually reproduces the speed and position of the vehicle according to the acceleration and angular velocity obtained by analyzing the acceleration data and angular velocity data.

The traffic accident data recorders of the above construction are used as mounted on vehicle such as cars, ships and aircrafts. Generally, when a vehicle encounters a traffic accident, it is quickly braked or, without quick braking, it crashes against or collides with something, or something collides with it from behind. Therefore, if the acceleration and angular velocity of the vehicle have been recorded, it is possible to know with their rapid changes when the traffic accident occurred. The traffic accident data recorders of the present invention record acceleration data and, if necessary, angular velocity data of a vehicle during a predetermined time period after a traffic accident occurrence time or a predetermined time period before and after the accident occurrence time.

The acceleration data show the speed changes of the vehicle at the accident occurrence time, and one can know from the data the shock of collision or crash, for example. The acceleration data are measured by the acceleration measurement means, for at least the traveling direction of the vehicle and, if necessary, the other directions than the traveling direction in the three-dimensional space. The measurement is carried out constantly while the vehicle is running. As the acceleration measurement means, acceleration sensors of various types may be used, such as the strain gage type, capacitance type, piezoelectric type and differential transformer type. The acceleration measured by the acceleration measurement means is outputed as acceleration data.

The angular velocity data show the changes in direction or position of the vehicle at the accident occurrence time, and one can know from the data how the direction of the vehicle has changed at the accident occurrence time. The angular velocity data are measured by the angular velocity measurement means, on the angular velocity about at least one direction in the three-dimensional space and, if necessary, on the angular velocity about the other directions. This measurement is also carried out constantly while the vehicle is running. As the angular velocity measurement means, various commercial angular velocity sensors may be used. The angular velocity measured by the angular velocity measurement means are output as angular velocity data.

The acceleration data output from the acceleration measurement means and the angular velocity data output from the angular velocity measurement means are stored by the storage means. The storage means may be a semiconductor memory or a magnetic recorder using a magnetic medium or the like. In the present invention, the control means controls the storage of the data in the storage means.

Specifically, the control means recognize the traffic accident occurrence time. The traffic accident occurrence time is defined as the time when the predetermined value has been exceeded by the acceleration data obtained at the acceleration measurement means or the angular velocity data obtained at the angular velocity measurement means. If the traffic accident occurrence time is recognized, the acceleration data and, if necessary, the angular velocity data are started being stored in the storage means. When the predetermined time has passed after the traffic accident occurrence time, the acceleration data and angular velocity data are stopped from being stored in the storage means. This construction makes the storage means store the acceleration data and, if necessary, the angular velocity data for the period after the vehicle encounters the traffic accident until the vehicle stops completely.

In the traffic accident data recorders storing the acceleration data and, if necessary, the angular velocity data before and after the traffic accident occurrence time, the storage means constantly stores the acceleration data and angular velocity data. This recording is carried out endlessly; accordingly, new data replace old data in order at regular intervals. The control means recognizes the traffic accident occurrence time witch is defined as the time when the predetermined value has been exceeded by the acceleration data obtained at the acceleration measurement means or the angular velocity data obtained at the angular velocity measurement means. When the predetermined time has passed before and after the traffic accident occurrence time, the acceleration data and angular velocity data are stopped from being stored in the storage means. This construction makes the storage means store the data for the period from the predetermined time before the vehicle encounters the traffic accident until the vehicle stops completely.

The traffic accident reproduction systems of the present invention analyze the acceleration and angular velocity of the vehicle, according to the acceleration data and, if necessary, the angular velocity data taken out of the traffic accident data recorders. If it is possible to know the acceleration and angular velocity of the vehicle at the traffic accident occurrence time, it is very easy to analyze the cause of the traffic accident.

The traffic accident reproduction systems of the invention may be constructed to visually reproduce on, for example, a display screen the speed and direction of the transportation means, which has encountered the accident, according to the acceleration and, if necessary, the angular velocity of the transportation means. This easily allows the cause to be analyzed further.

Because the traffic accident data recorders of the present invention do not need signals, as the conventional flight recorders do, from parts of vehicle on which they are mounted, no wiring is needed to supply the signals. Therefore, it is possible to easily analyze a traffic accident by a simple operation of merely mounting on a vehicle a traffic accident data recorder according to the present invention. Also, because it is possible to use acceleration sensors and angular velocity sensors which are supplied as highly general, independent units, it is possible to produce a traffic accident data recorder at a remarkably low cost in comparison with flight recorders.

Also, the traffic accident reproduction system can easily analyze the speed, position, direction, etc. of a vehicle at a traffic accident occurrence time, according to the data recorded in the traffic accident data recorder mentioned above. Therefore, it is possible to look into the cause of a traffic accident in a very short time and accurately. Also, because a traffic accident can be reproduced visually, it is possible to easily look into the cause of the accident.

Further, according to the present invention, because the data to be recorded are only the data during a predetermined time period when a traffic accident occurs, a small memory capacity suffices. Also, because the traffic accident data recorder has only an acceleration sensor, an angular velocity sensor if necessary, a semiconductor memory, a very small control means such as a microcomputer, etc., it has the advantage of being able to make the whole recorder small in size.

BRIEF DESCRIPTION OF THE DRAWINGS

The invention will be better understood from the following detailed description taken in conjunction with the accompanying figures of the drawings, wherein.

DETAILED DESCRIPTION OF THE INVENTION

Figure 1:
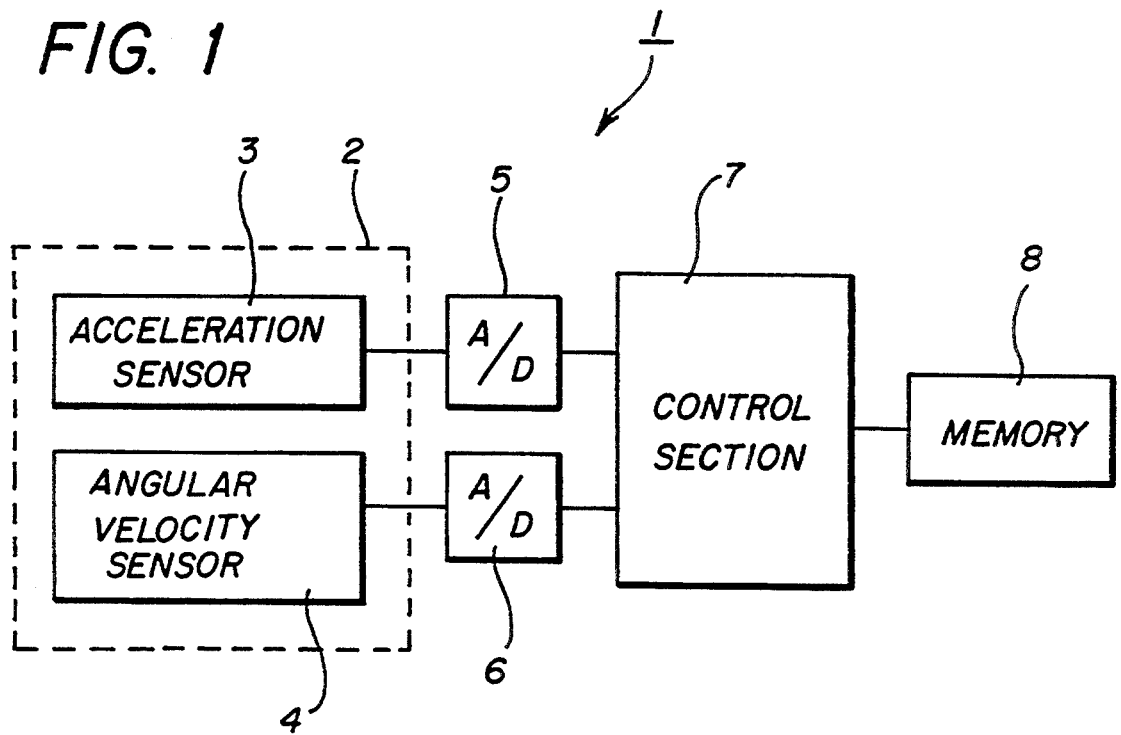
FIG. 1 is a block diagram schematically showing the construction of a traffic accident data recorder according to an embodiment of the present invention.
Figure 2:
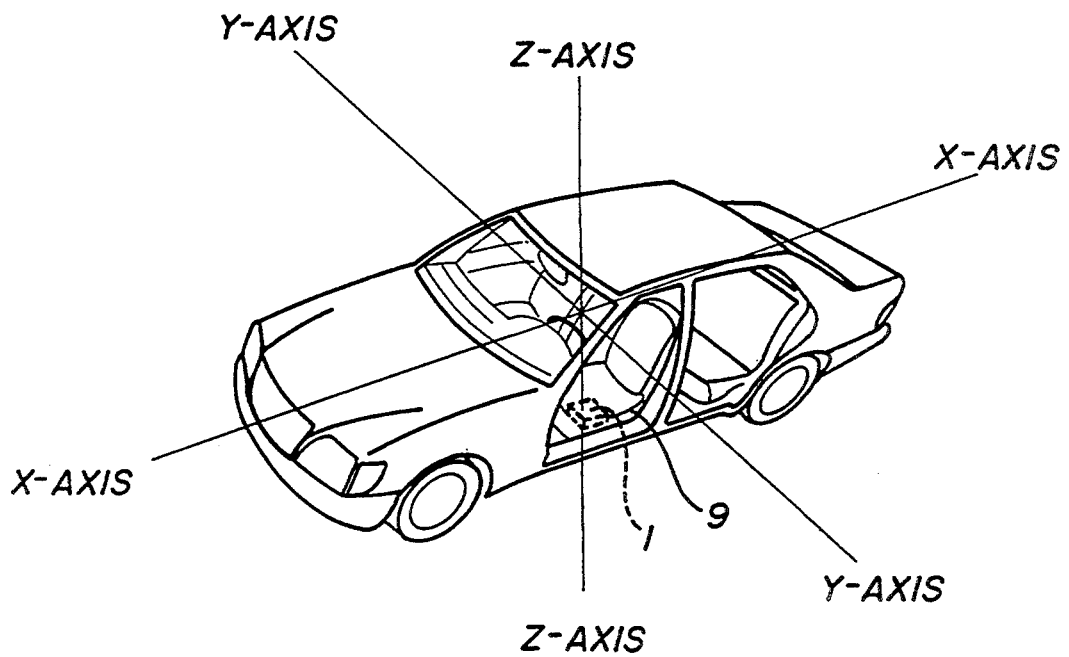
FIG. 2 is a view showing how the traffic accident data recorder of FIG. 1 is mounted on a car.

Embodiments of the present invention are described in more detail with reference to the drawings. FIG. 1 is a block diagram showing schematically a traffic accident data recorder 1, which comprises a sensor section 2, A/D converters 5 and 6, a control section 7 and a semiconductor memory 8. The sensor section 2 includes a three-dimensional acceleration sensor 3 for measuring acceleration in the three directions of X-axis, Y-axis and Z-axis in a rectangular coordinate system of a three-dimensional space, and a three-dimensional angular velocity sensor 4 for measuring angular velocity. The traffic accident data recorder 1 is, as shown in FIG. 2, mounted horizontally under the driver's seat 9 on a vehicle, such as a car, for example. The X, Y and Z coordinates of the three-dimensional acceleration sensor 3 and three-dimensional angular velocity sensor 4 is not particularly limited, but are preferably directed as shown in FIGS. 2 and 3 in this embodiment.

Figure 3:
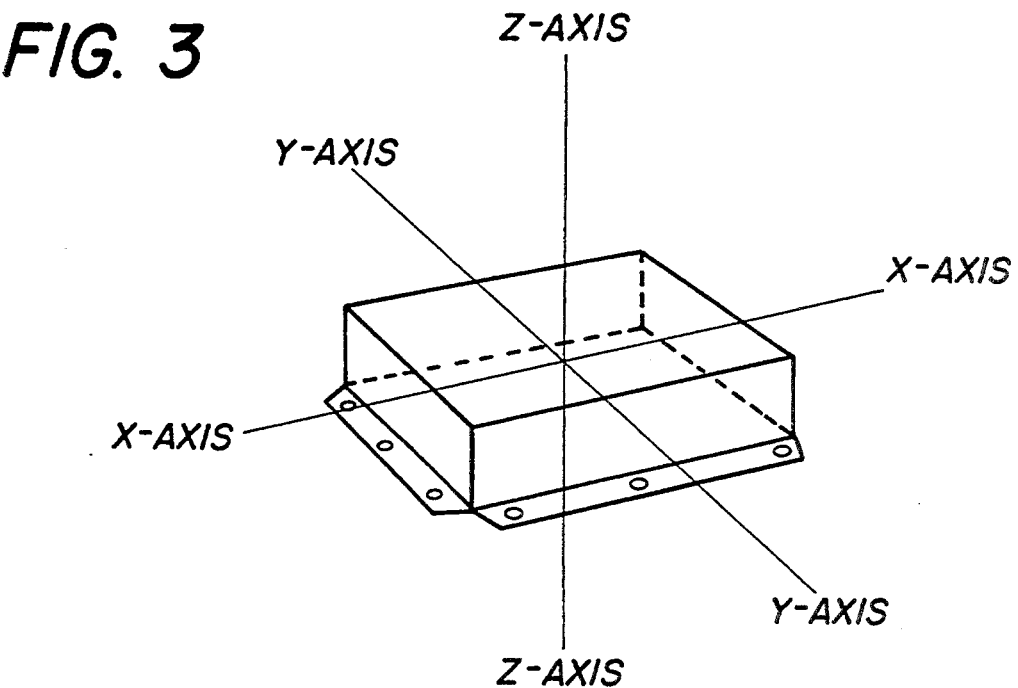
FIG. 3 is a view showing a case for housing the traffic accident data recorder of FIG. 1.
Figure 4:
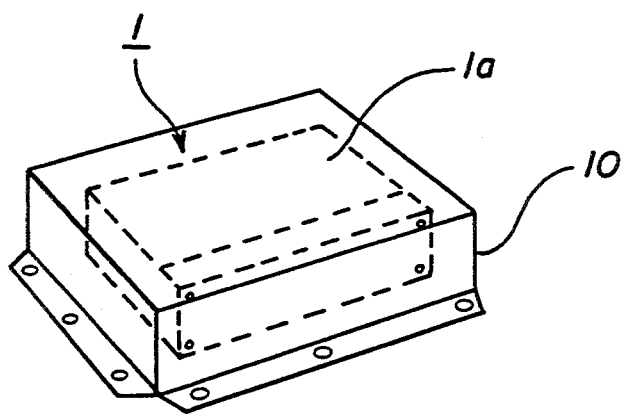
FIG. 4 is a view showing how the case of FIG. 3 houses the traffic accident data recorder of FIG. 1
Figure 5:
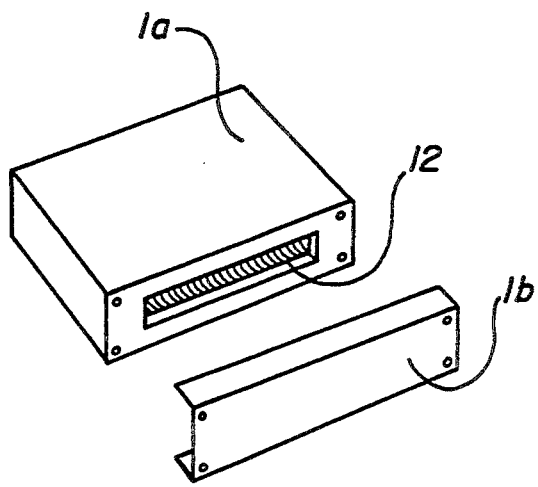
FIG. 5 is a perspective view showing the state in which the cover of the traffic accident data recorder is removed.

As shown in FIGS. 3 and 4, the traffic accident data recorder 1 is housed in a case 10, which is secured with screws passing through holes 11 formed in the case 10 to mount the recorder 1 on the car. The case 10 needs to have sufficient strength to withstand impact forces when a traffic accident occurs. FIG. 4 shows how the case 10 houses the traffic accident data recorder 1. The traffic accident data recorder 1 further includes, as shown in FIG. 5, a main body 1a and a cover 1b. The body 1a has a connector section 12, which is later used when connected to an apparatus for data analysis such as a computer, but which is sealed with the cover 1b while the recorder is mounted on the car.

With reference to FIG. 1, the acceleration sensor 3 detects an impact, as acceleration, which is imparted on the car by, for example, quick braking, collision, crash or the like, while the angular velocity sensor 4 detects turning of the car as angular velocity. The outputs of the acceleration sensor 3 and the angular velocity sensor 4 are in analog form, which are converted into digital form by the A/D converters 5 and 6, and then input signals as acceleration data and angular velocity data into the control section 7. In this embodiment, acceleration measurement means comprises the acceleration sensor 3 and A/D converter 5, while the angular velocity measurement means comprises the angular velocity sensor 4 and the A/D converter 6. In this embodiment, the control section 7 functions as control means and consists of a microcomputer, for example. The control section 7 receives the output data from the A/D converters 5 and 6, and stores them in the memory 8 when necessary. In this embodiment, the memory 8 functions as storage means. The memory 8 may be a semiconductor memory such as a RAM and an E2 PROM. A RAM needs an exclusive backup power source to be provided.

In this embodiment, the acceleration sensor 3 and the angular velocity sensor 4 each measure in the three directions of the X-axis, Y-axis and Z-axis. Accordingly, the control section 7 independently controls the data on acceleration in the three directions and angular velocity in the three directions. Also, the memory 8 stores the data on acceleration in the three directions and angular velocity in the three directions.

In this embodiment, threshold values are preset in the control section 7 for the acceleration data and angular velocity data in the three directions of X-axis, Y-axis and Z-axis, respectively. When data exceeding the threshold values are received by the control section 7, it recognizes that point of time as the time when a traffic accident occurs. For example, if the preset threshold values for the acceleration data in the respective directions are XAM, YAM and ZAM, and if the measured acceleration data in the respective directions are XA, YA and ZA, it is determined or judged that a traffic accident has occurred when any of the following relations is established:

XA>XAM,
YA>YAM and
ZA>ZAM.

That point of time is recognized as the traffic accident occurrence point of time. In other words, it is determined that a traffic accident has occurred if at least one, but not necessarily all, of XA, YA and ZA exceeds the threshold value.

Likewise, for example, if the preset threshold values for the angular velocity data about the respective directions are XWM, YWM and ZWM, and if the measured angular velocity data about the respective directions are XW, YW and Zw, it is determined that a traffic accident has occurred when any of the following relations is established:

XW>XWM,
YW>YWM and
ZW>ZWM.

That point of time is recognized as the traffic accident occurrence point of time. Accordingly, in this embodiment, it is determined that a traffic accident has occurred if at least one, but not necessarily all, of XA, YA, ZA, XW, YW and Zw exceeds the threshold value. Because the acceleration is negative when the car is braked, collides or crashes, and it is positive when the car is struck from behind and accelerated, it is determined relative to the absolute value or base line of acceleration data whether the threshold value is exceeded or not.

Figure 6:
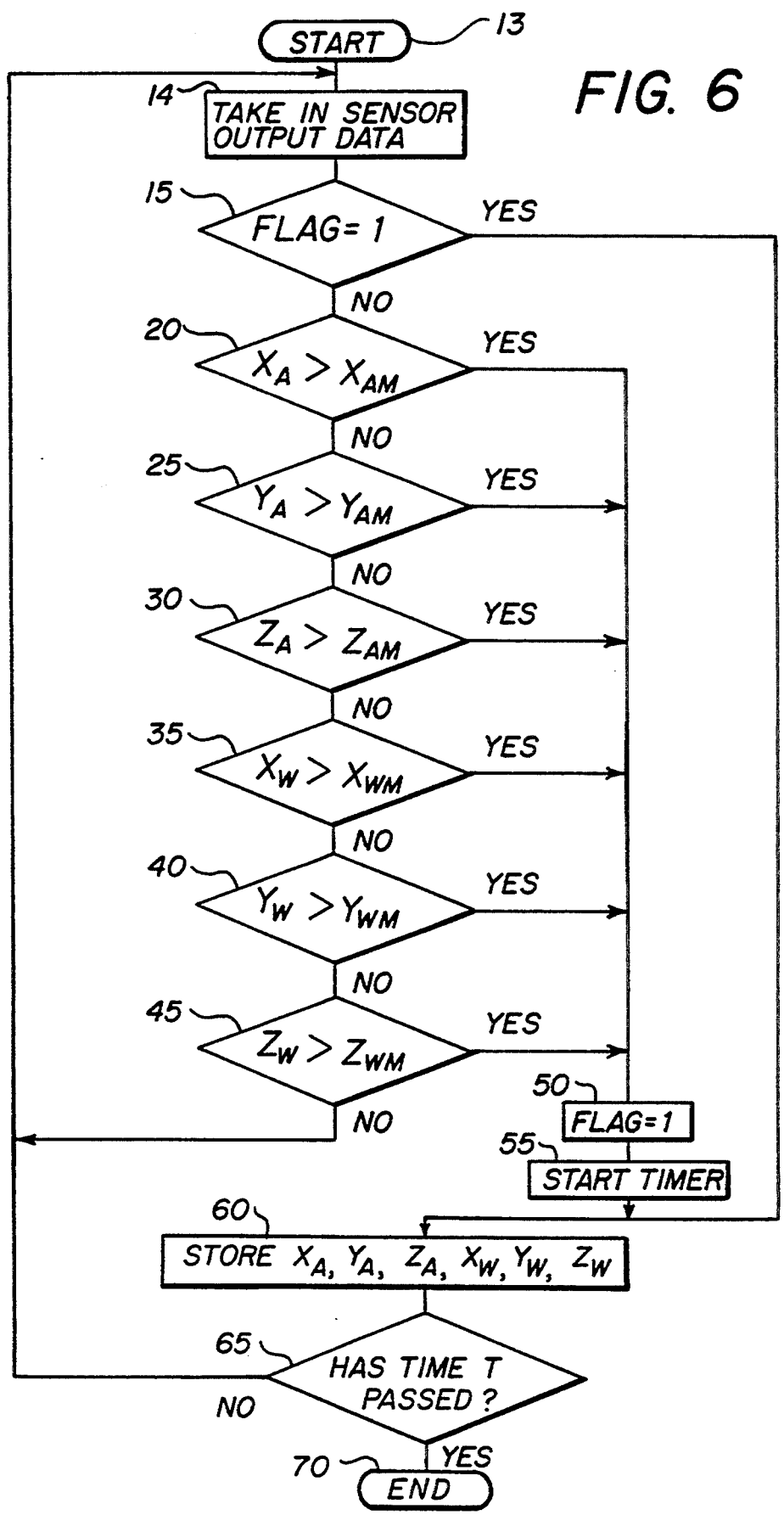
FIG. 6 is a flowchart showing a control operation of the control section of the traffic accident data recorder.

The control operation of control section 7 is illustrated by the flowchart of FIG. 6. The control section 7 starts the sequence of FIG. 6 when the car engine starts (step 13). First, at step 14, the acceleration data and angular velocity data output from the acceleration sensor 3 and the angular velocity sensor 4 through the A/D converters 5 and 6 are received. Then, at step 15, it is determined whether a flag is raised (FLAG =1) indicating whether a traffic accident has occurred or not. Because initially this flag is not raised, the operation proceeds to the next step 20. Steps 20, 25, 30, 35, 40 and 45 are steps where it is determined whether a traffic accident has occurred or not, and where it is determined whether the acceleration data XA, YA, ZA and the angular velocity data XW, YW, Zw, which are input as stated above, exceed the respective threshold values XAM, YAM, ZAM and XWM, YWM, ZWM. If these input data XA, YA, ZA, XW, YW and ZW are all at the threshold values or lower, the operation returns to step 14 as there is nothing abnormal, and the same steps 14-45 are executed repeatedly.

At steps 20-45, if at least one of the acceleration data and angular velocity data exceeds the threshold value, the operation proceeds to step 50, where the flag is set 1. Then, at step 55 a timer is started. If the control section 7 is, for example, a microcomputer, the timer function of the microcomputer may be utilized for the timer. After the timer is started at step 55, the operation proceeds to step 60, where the input data XA, YA, ZA, XW, YW and Zw are entered into the memory 8. At this time, it is preferable to write the accident occurrence time with these data into the memory 8. After the input data are written, at step 65 it is determined whether a preset time T has passed or not after the timer started. The time T is set sufficiently longer than the time after an accident occurs until the car completely stops. Accordingly, the memory 8 also needs to have a capacity adapted for the time T. If the preset time T has not passed, the operation returns to step 14, where the next data are input from the acceleration sensor 3 and angular velocity sensor 4 through the A/D converters 5 and 6.

Then, at step 15, because the flag 1 is already set, the operation goes from step 15 to step 60, where the input data XA, YA, ZA, XW, YW and Zw are written with the time into the memory 8. At step 65 it is determined whether the time T has passed after the accident occurrence point of time or not. If not, the operation returns again to step 14, and likewise steps 14, 15, 60 and 65 are repeated. If the time T has passed, the operation goes from step 65 to step 70, where the control sequence ends.

Thus in this embodiment, absent a traffic accident, no data are written into the memory 8, but when a traffic accident occurs the data are written for the time T after the accident.

Figure 7:
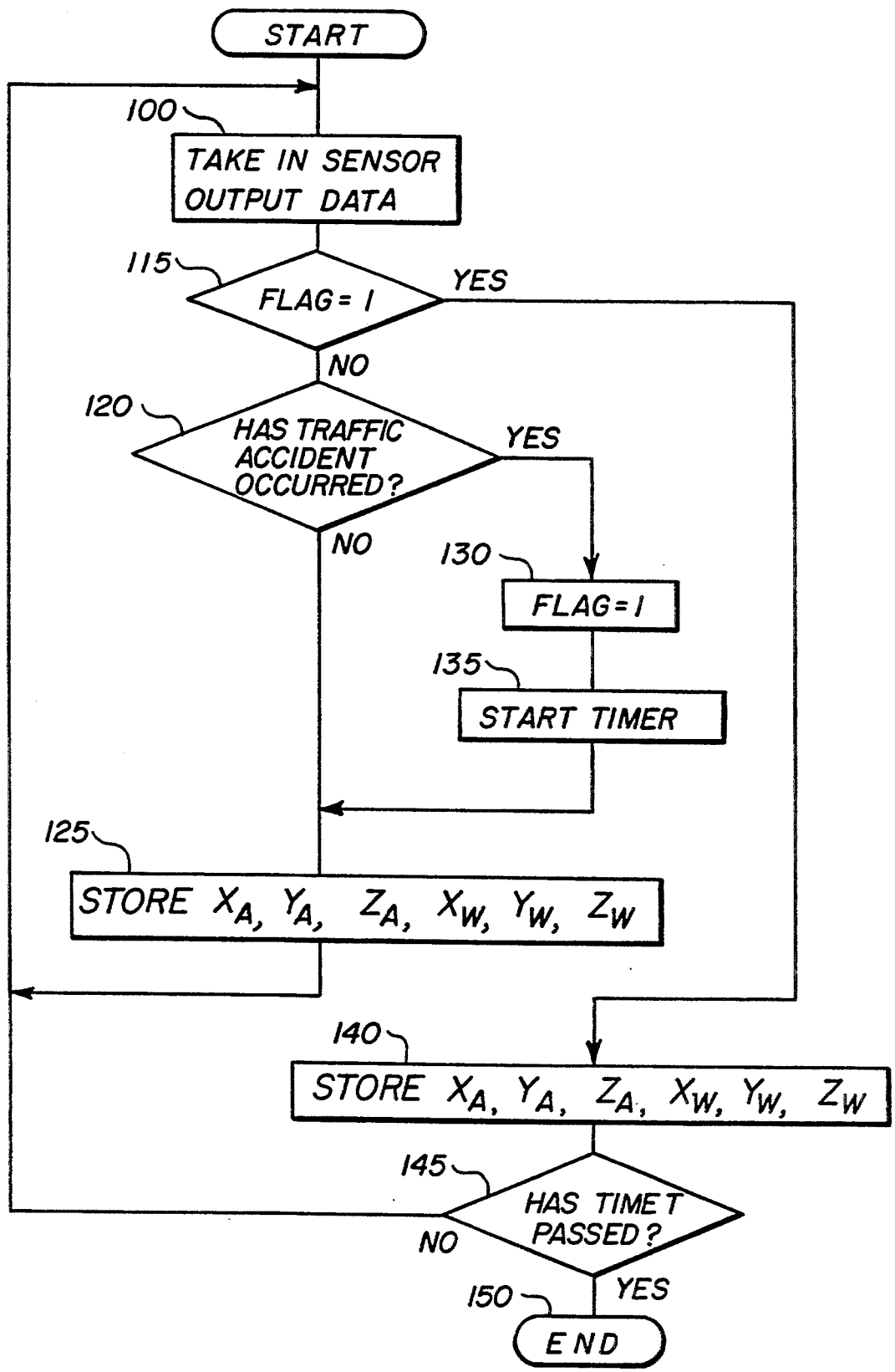
FIG. 7 is a flowchart showing another control operation of the control section of the traffic accident data recorder.

FIG. 7 shows a flowchart of another embodiment adapted to store not only the acceleration data and the angular velocity data after the point of time when a traffic accident occurs, but also the data prior to an accident. In this embodiment, the acceleration data and angular velocity data are stored in the memory 8, which are also in a normal condition before a traffic accident occurs. If the memory 8 is full, the oldest data are replaced by new data in order, so that the memory 8 stores the most recent data continuously.

In this construction, when the engine of a car starts, the sequence shown in FIG. 7 is started. At step 100, the acceleration data and angular velocity data output from the acceleration sensor 3 and angular velocity sensor 4 are received through the A/D converters 5 and 6. At step 115, it is determined whether or not a flag is raised (FLAG =1) showing a traffic accident occurrence. Because the flag is initially not raised, the operation goes to step 120, which is a step where it is determined whether a traffic accident has occurred or not. This step 120 is shown as a simplification of steps 20-45 of FIG. 6. If it is determined at step 120 that a traffic accident has not occurred, the input acceleration data XA, YA, ZA and angular velocity data XW, YW, Zw are written into the memory 8 at step 125, and then the operation returns to step 100. Next, again at step 115, it is determined whether the flag is set 1 or not. Further if it is determined at step 120 that a traffic accident has not occurred, further at step 125 the acceleration data and angular velocity data are stored in the memory 8. Thus, until a traffic accident occurs and the flag is set 1, steps 100, 115, 120 and 125 are repeated.

If it is determined at step 120 that a traffic accident has occurred, the flag is raised at step 130 showing the accident occurrence, and then at step 135 a timer is started. Then at step 125, the acceleration data and angular velocity data are entered into the memory 8. Then the operation returns to step 100.

Because it is determined at the next step 115 that the flag is 1 (FLAG =1), the operation goes to step 140, where the acceleration data and angular velocity data are stored in the memory 8. Then it is determined whether or not a time T has passed. If the time T has not passed, steps 100, 115, 140 and 145 are executed again repeatedly. If it is determined at step 145 that the time T has passed, the control sequence ends.

Figure 8:
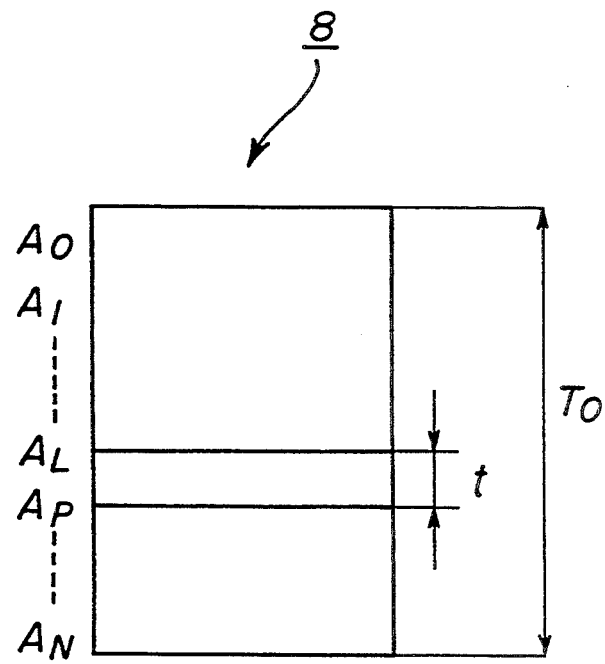
FIG. 8 is a view describing the recording method in a memory.

With reference to FIG. 8, the recording system in the memory 8 is now described. In FIG. 8, only acceleration data XA of data XA, YA, ZA, XW, YW, and Zw which should be stored will be explained, but the same applies likewise to the other data. First, normally, i.e., when a traffic accident has not occurred, data XA are written in order into addresses A0, A1, ... AN. When the datum has been written into AN, the writing returns again to A0, where the datum is replaced by the new one. In order to simplify the explanation, it is assumed that datum XA input each time at step 100 of FIG. 7 is written into A0, A1, ... AN, respectively, at step 125. When a traffic accident occurrence is determined, if the data from a time (t) before address AP storing datum XA at the occurrence point of time, i.e., the data stored at AL-AP, are also to be kept, assuming that the time taken to write the data into the whole memory 8 is (T0), the time (T) to be set in the timer may be set T=T0−t. By thus setting the time (T), the data before the traffic accident occurrence, i.e., the data stored at AL-AP, and the data after the traffic accident occurrence, i.e., the data stored at AP-AN and A0-AL will be kept.

Figure 9:
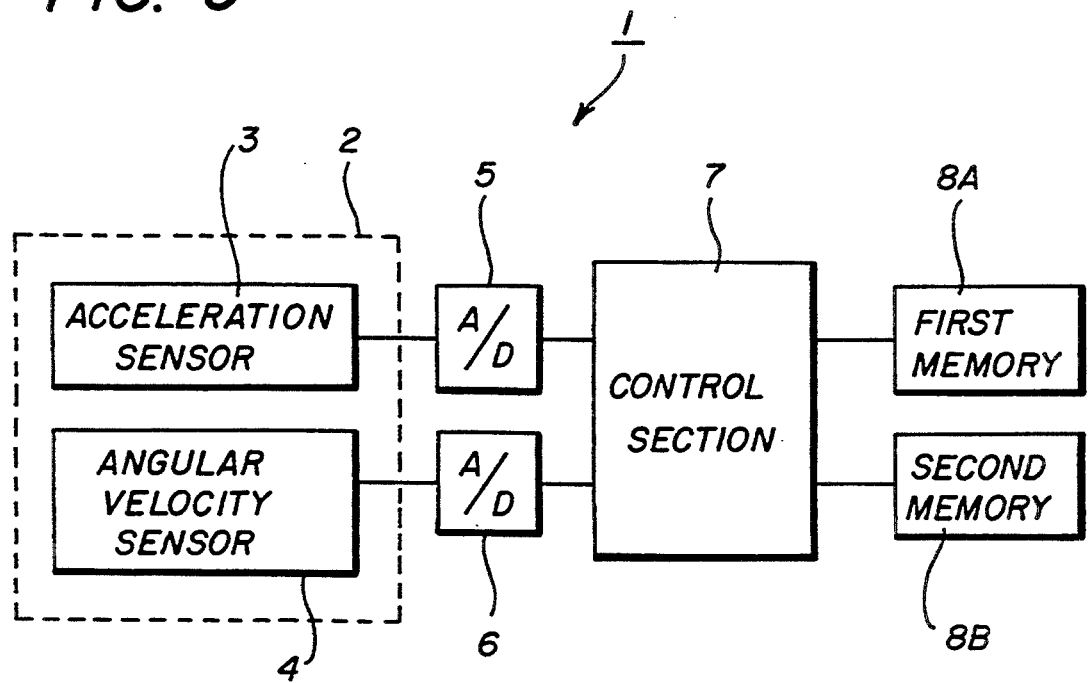
FIG. 9 is a block diagram schematically showing the construction of a traffic accident data recorder according to another embodiment of the invention.

FIG. 9 shows another embodiment adapted to keep the data before a traffic accident occurrence and the data after the occurrence in separate memories. In this embodiment, a first memory 8A and a second memory 8B are used as storage means. The other construction is similar to that of FIG. 1, and the corresponding parts are given the same numerals. These memories 8A and 8B may be either separate memories, or one memory divided into two regions.

Figure 10:
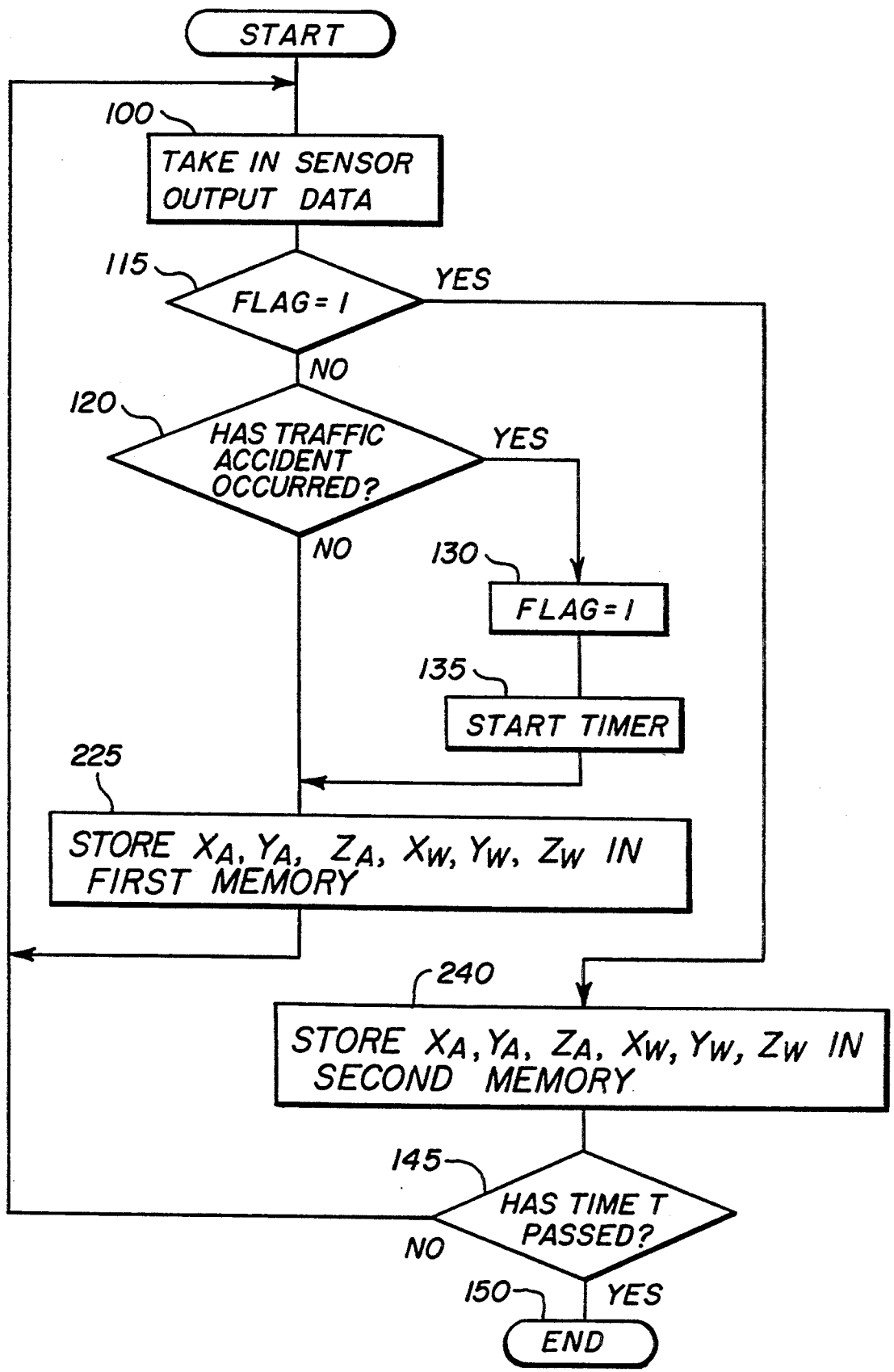
FIG. 10 is a flowchart showing the control operation of the control section of the traffic accident data recorder of FIG. 9.

FIG. 10 shows the flowchart in the traffic accident storage data having the construction of FIG. 9. This flowchart is substantially the same as that of FIG. 7, but differs in that step 125 of storing the input data in the memory 8 is replaced by step 225 of storing the input data in the memory 8A, while step 140 of storing the input data also in the memory 8 is replaced by step 240 of storing the input data in the memory 8B. In this embodiment, if a traffic accident has not occurred, the data taken in at step 100 are stored in the first memory 8A at step 225. The storage in this memory 8A is performed by an endless manner, in which replacement is made when it is full. If a traffic accident has occurred, steps similar to those explained for the FIG. 7 flowchart are executed, but in contrast to the FIG. 7 system the data taken in at step 100 are written into the second memory 8B at step 240. Thus, according to this embodiment, switching is made to store the acceleration data and angular velocity data before traffic accident occurrence in the first memory 8A and, after the occurrence, to store the data in the second memory 8B.

In the flowcharts of FIG. 6, 7 and 10, although no reference is made to the cycle for which the acceleration data and angular velocity data are recorded in the memories, it is not necessary to successively record them, but it is preferable to sample and record them at predetermined intervals of time. When a traffic accident has occurred, it is preferable that the data after the accident occurrence should be in detail, but it is not necessary to strictly know the data before the occurrence. Consequently, in the embodiments of FIG. 7 and 10, it is more preferable to change across a traffic accident occurrence time point the period for which the data are sampled and recorded. However, in the FIG. 6 embodiment, because only the data after a traffic accident occurrence time point are recorded, it is not necessary to change the recording period.

Figure 11:
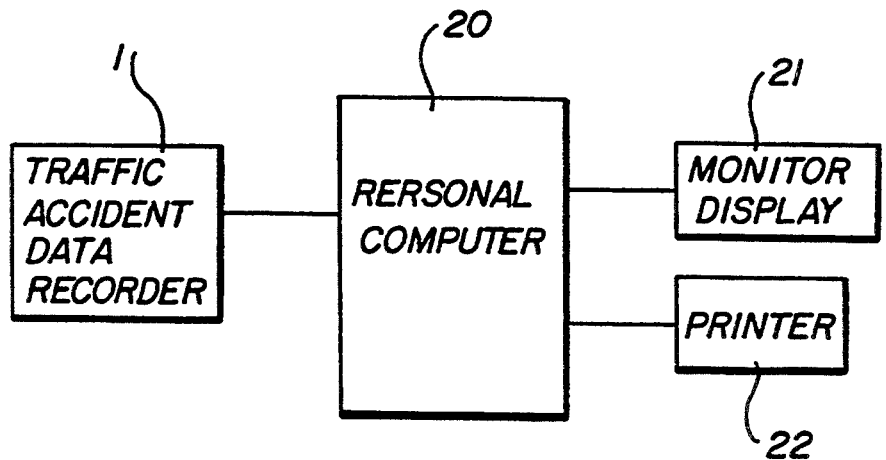
FIG. 11 is a block diagram schematically showing the construction of an accident reproduction system according to another embodiment of the invention.
Figure 12:
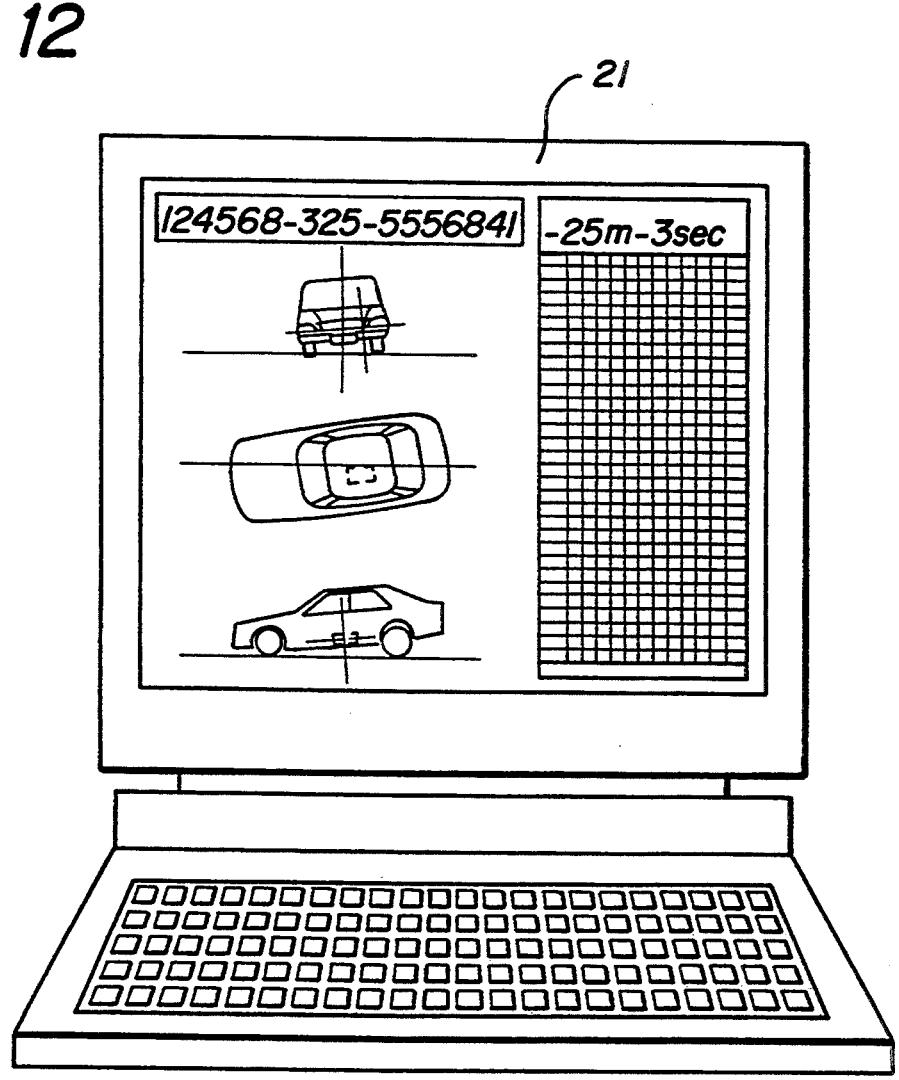
FIG. 12 is a view showing how a traffic accident is reproduced visually on a display screen.
Figure 13:
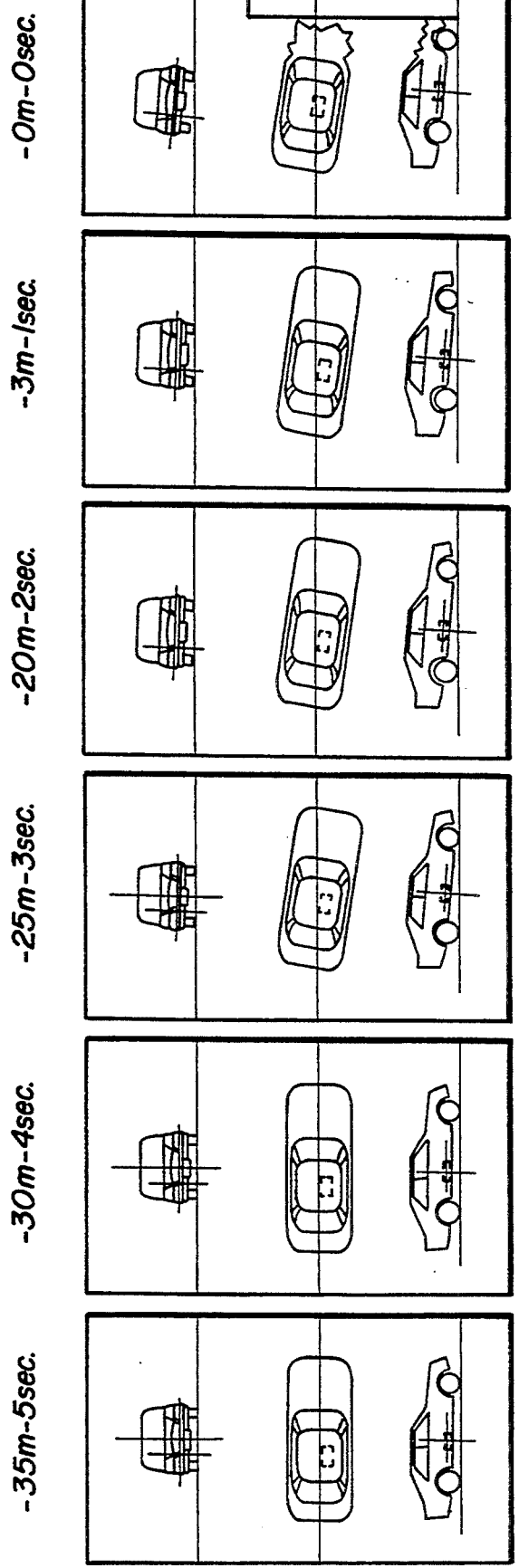
FIGS. 13(a), 13(b), 13(c), 13(d), 13(e), and 13(f) are views showing in time sequence the occurrence of a traffic accident.

A traffic accident reproduction system for analyzing a car accident by using a traffic accident data recorder, which has recorded acceleration data and angular velocity data as described above, will now be explained. First, the traffic accident data recorder is removed from the car. Then, as shown in FIG. 11, the acceleration data and angular velocity data are read out of the memory 8 or memories 8A and 8B into a personal computer 20. Next, the computer 20 analyzes the data and, as shown in FIG. 12, visually shows on the screen of a monitor display 21 the speed, direction, position, etc. of the car with respect to the X-axis, Y-axis and Z-axis. At this time, as shown in FIGS. 13(a), 13(b), 13(c), 13(d), 13(e), and 13(f) for example, it is possible to reproduce as an image for every second the state of the car from the quick braking time point shown in FIG. 13(a) to the crash and stop shown in FIG. 13(f). The image can be reproduced not only on the screen, but also on paper by printing it out by a printer 22 (FIG. 11).

As explained hereinbefore, because the traffic accident data recorder of each of the above embodiments does not need data from a car's speed indicator, brake oil pressure gauge, etc., there is no need of wiring for supplying the data. It is therefore possible to analyze a traffic accident easily by a simple operation of merely securing under, for example, a seat of a car.

Because the traffic accident reproduction system of this embodiment can easily analyze a car's speed, position, direction, etc. at a traffic accident occurrence time, according to the data recorded by the traffic accident data recorder, it is possible to look into the cause of the accident accurately in a very short time. Also, because a traffic accident can be reproduced visually, it is possible to easily look into the cause of the accident.

Figure 14:
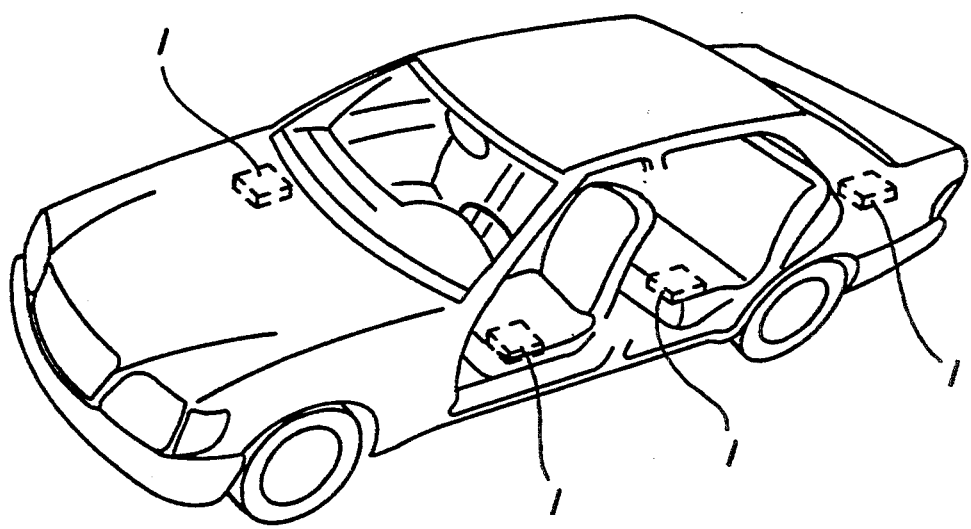
FIG. 14 is a view showing a number of traffic accident data recorders mounted on a car.

In the above embodiment, explanation is made on a case where an accident is reproduced according to the data recorded in the traffic accident data recorder of one car. However, in a case such as a rear-end collision, the data in the traffic accident data recorder on each of the colliding cars may be analyzed and, at the same time, the cars' states may be reproduced, in order to analyze the rear-end collision in much more detail and accurately. Also, as shown in FIG. 14, a plurality of traffic accident data recorders 1 may be mounted on one car; in this case, it is possible to record a traffic accident of the car in more detail, and thereby analyze the accident in more detail.

In each of the above embodiments, the traffic accident data recorder and traffic accident reproduction system are applied to a car, but such may be mounted on other means of transportation (vehicles) such as ships and aircrafts for application to record and reproduce traffic accidents involving them. If the traffic accident data recorder is applied to another means of transportation, it is necessary to change, according to the speed of the transportation means, the time period length for which the acceleration data and angular velocity data are recorded and the threshold values of acceleration data and angular velocity data. Generally, the higher the speed of a vehicle is, the shorter the time period for which the data are recorded is, and also the shorter the recording intervals are set. Accordingly, in the case of a ship, the recording time period is long, and the recording intervals are set also long. In the case of an aircraft, there is a substantial time after, for example, something abnormal occurs to the aircraft body until an accident occurs, and accordingly the memory capacity must be large.

Further, in each of the above embodiments explanation is made on a case where data in the three directions are recorded for each of acceleration and angular velocity, but the construction may be adapted to measure only acceleration if it is not necessary to analyze an accident in detail. Also, there may be a case where it is not necessary to measure acceleration in all three directions of X-axis, Y-axis and Z-axis, but it is sufficient for analysis of an accident if measurement can be made at least for the direction in which a car moves. Likewise, it is not necessary to measure angular velocity for all three directions. Also, more strict accident analysis can be made, if a GPS (global positioning system) using a space satellite is utilized to record the absolute time and the absolute position particularly in the case of a ship.

What is claimed is:

1. A traffic accident reproduction system for reproducing a traffic accident of a vehicle during a predetermined time period after a traffic accident occurrence time, the traffic accident reproduction system comprising:

acceleration measurement means for measuring acceleration of the vehicle in three axial directions in a three-dimensional space to output acceleration data, angular velocity measurement means for measuring angular velocity of the vehicle about three directional axes in a three-dimensional space, to output angular velocity data, storage means for storing the acceleration data and the angular velocity data, control means for determining the traffic accident occurrence time by recognizing a time when a predetermined acceleration value has been exceeded by a respective acceleration datum obtained by the acceleration measurement means or a predetermined angular velocity value has been exceeded by a respective angular velocity datum obtained by the angular velocity measurement means, to start the acceleration data and the angular velocity data being stored in the storage means, and for stopping the acceleration data and the angular velocity data from being stored in the storage means when the predetermined time has passed after the traffic accident occurrence time, analyzing means for analyzing the acceleration data and the angular velocity data from said storage means to obtain traffic accident data indicating the speed, posture and position of the vehicle during said predetermined time period, and visualizing means for visualizing the speed, posture and position of the vehicle based on said traffic accident data during said predetermined time period.

2. A traffic reproduction system according to claim 1, wherein said visualizing means is a monitor display.

3. A traffic accident reproduction system according to claim 1, wherein said visualizing means is a printer.

4. A traffic accident reproduction system for reproducing a traffic accident of a vehicle during a predetermined time period before and after a traffic accident occurrence time, the traffic accident reproduction system comprising:

acceleration measurement means for measuring acceleration of the vehicle in three axial directions in a three-dimensional space to output acceleration data, angular velocity measurement means for measuring angular velocity of the vehicle about three directional axes in a three-dimensional space, to output angular velocity data, storage means for storing constantly and endlessly at certain time intervals the acceleration data and the angular velocity data during the predetermined time up to the present time, control means for determining the traffic accident occurrence time by recognizing a time when a predetermined acceleration value has been exceeded by a respective acceleration datum obtained by the acceleration measurement means or a predetermined angular velocity value has been exceeded by a respective angular velocity datum obtained by the angular velocity measurement means, and for stopping the acceleration data and the angular velocity data from being stored in the storage means when a predetermined time has passed before and after the traffic accident occurrence time, analyzing means for analyzing the acceleration data and the angular velocity data from said storage means to obtain traffic accident data indicating the speed, posture and position of the vehicle during said predetermined time period, and visualizing means for visualizing the speed, posture and position of the vehicle based on said traffic accident data during said predetermined time period.

5. A traffic accident reproduction system according to claim 4, wherein the storage means includes means for storing the acceleration data and the angular velocity data at shorter time intervals after the traffic accident occurrence time and longer time intervals before the traffic accident occurrence time.

6. A traffic accident reproduction system according to claim 4, wherein said visualizing means is a monitor display.

7. A traffic accident reproduction system according to claim 4, wherein said visualizing means is a printer.

* * * * *